(12) United States Patent
Janz

(10) Patent No.: US 7,325,835 B2
(45) Date of Patent: Feb. 5, 2008

(54) DEFLECTION ELEMENT FOR SAFETY BELT SYSTEMS IN VEHICLES

(75) Inventor: Norbert Janz, Wustermark (DE)

(73) Assignee: J&S GmbH Automotive Technology, Wustermark (DE)

( * ) Notice: Subject to any disclaimer, the term of this patent is extended or adjusted under 35 U.S.C. 154(b) by 0 days.

(21) Appl. No.: 11/481,760

(22) Filed: Jul. 6, 2006

(65) Prior Publication Data

US 2007/0017085 A1    Jan. 25, 2007

(30) Foreign Application Priority Data

Jul. 21, 2005  (DE) ...................... 10 2005 034 804

(51) Int. Cl.
   *B60R 22/00*    (2006.01)
   *B23P 17/00*    (2006.01)
(52) U.S. Cl. .................. 280/801.1; 280/808; 29/527.4
(58) Field of Classification Search ............ 280/801.1, 280/808; 29/3, 527.4; 72/414, 379.2
   See application file for complete search history.

(56) References Cited

U.S. PATENT DOCUMENTS

| 5,735,163 | A | * | 4/1998 | Sato et al. ..................... 72/348 |
| 5,768,753 | A | * | 6/1998 | Mondel .................. 24/265 BC |
| 5,918,903 | A | * | 7/1999 | Ito ........................... 280/801.1 |
| 6,260,402 | B1 | * | 7/2001 | Leek .......................... 72/379.2 |
| 6,324,730 | B1 | * | 12/2001 | Iseki ........................... 24/197 |
| 6,533,322 | B2 | * | 3/2003 | Janz ........................... 280/808 |
| 6,662,426 | B2 | * | 12/2003 | Ito ............................ 29/527.4 |
| 6,702,327 | B2 | * | 3/2004 | Janz ........................... 280/808 |
| 6,739,625 | B2 | * | 5/2004 | Tomita et al. .............. 280/808 |
| 6,821,471 | B2 | * | 11/2004 | Olsson ....................... 264/293 |
| 6,964,084 | B2 | * | 11/2005 | Ito ............................... 24/198 |
| 2002/0190517 | A1 | * | 12/2002 | Kang ...................... 280/801.1 |
| 2002/0190518 | A1 | * | 12/2002 | Kang ...................... 280/801.1 |
| 2004/0227341 | A1 | * | 11/2004 | Hattori .................... 280/801.1 |

FOREIGN PATENT DOCUMENTS

| DE | 9110443 | 1/1992 |
| DE | 10153062 | 4/2003 |

* cited by examiner

*Primary Examiner*—Paul N. Dickson
*Assistant Examiner*—Joselynn Y. Sliteris
(74) *Attorney, Agent, or Firm*—Collard & Roe, P.C.

(57) ABSTRACT

A method for producing a deflection element for safety belt systems in vehicles, includes making grooves in a flat metal blank, using an embossing tool, and producing a metal body from the flat metal blank, by means of punching and cold deformation. The metal body has an attachment opening and a belt eye having a belt surface that is rounded in cross-section, to guide a safety belt, whereby the belt running surface contains the grooves previously formed in the flat metal blank.

6 Claims, 2 Drawing Sheets

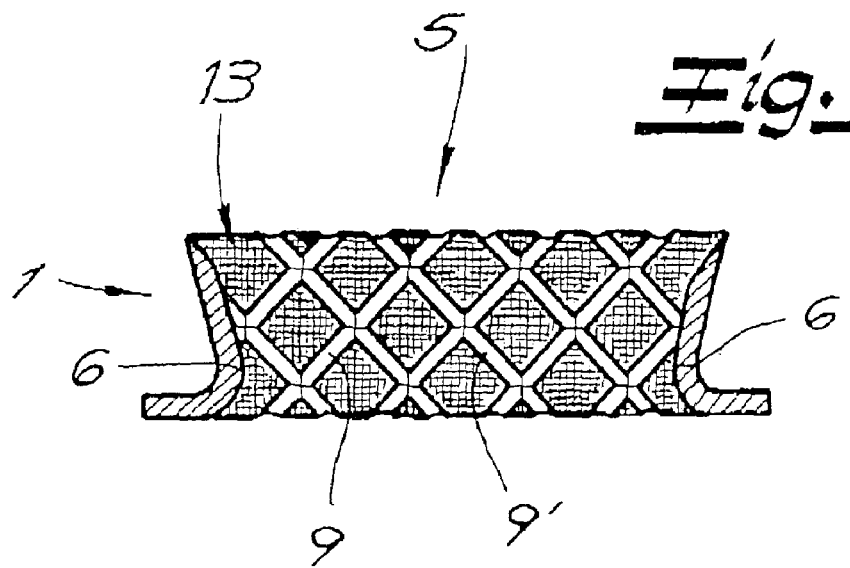
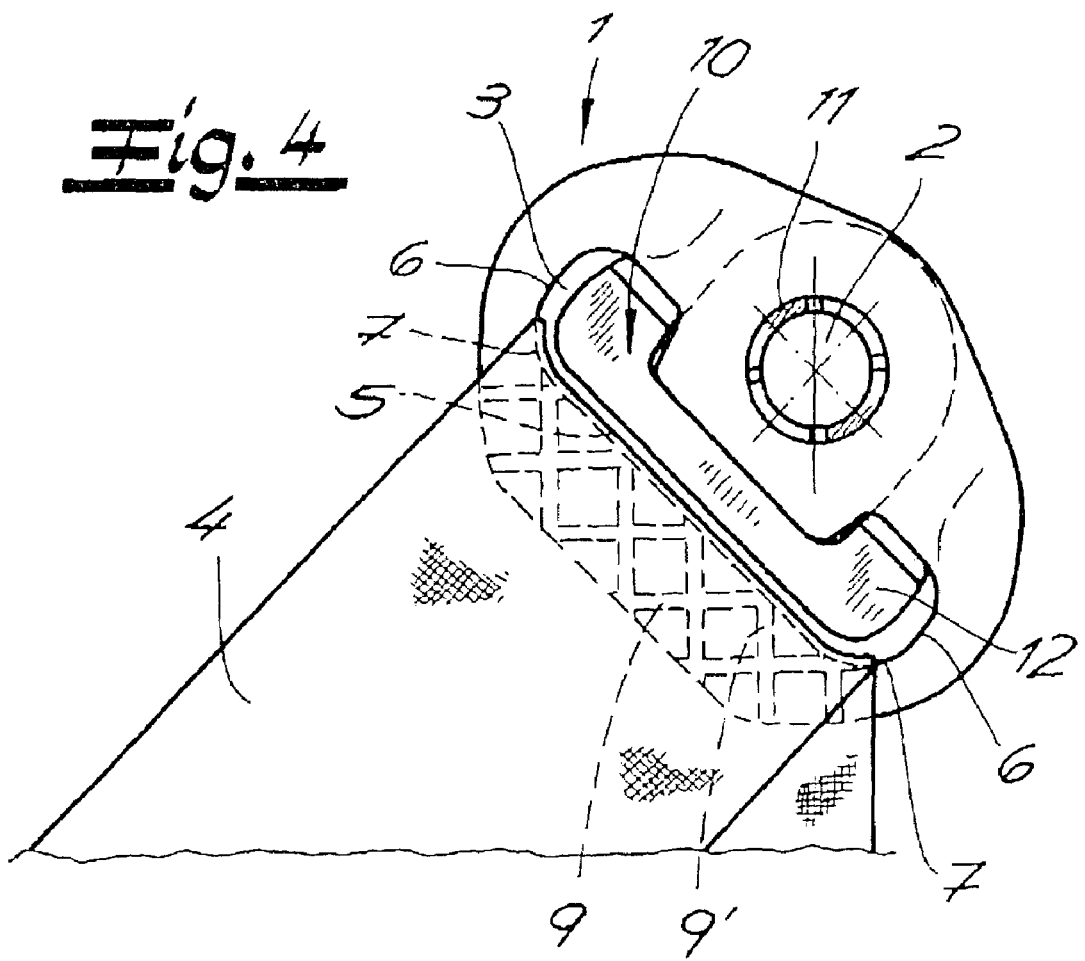

DEFLECTION ELEMENT FOR SAFETY BELT SYSTEMS IN VEHICLES

BACKGROUND OF THE INVENTION

1. Field of the Invention

The invention relates to a method for producing a deflection element for safety belt systems in vehicles, in which a metal body is produced by means of punching and cold deformation, which body has an attachment opening and a belt eye having a belt surface that is rounded in cross-section.

2. The Prior Art

Such a deflection element having a one-piece metal body produced from sheet steel by means of cold deformation is known, for example, from German Patent No. DE 101 53 062 C1. The metal body has an attachment opening and a belt eye for guiding a safety belt. The belt eye is delimited on the underside by a belt running surface as well as laterally by belt guide segments that constantly follow the belt running surface with connection roundings. The belt running surface as well as the lateral belt guide segments have a cross-sectional profile that is rounded in the pulling direction of the safety belt.

In the case of dynamic stress in a crash situation, the deflection element can rotate about the pin with which the deflection element is attached to the vehicle body, in a pivoting movement. In this connection, there is the risk that the safety belt will slip into a corner of the belt eye, and this has a negative effect on the function of the safety belt system overall. Slipping of the safety belt in the belt eye has the result that the retention force does not act uniformly on the person belted in. Sometimes, doubling of the safety belt that slips into a corner of the belt eye also occurs, in this connection, which brings about great friction of a belt eye and, in an extreme case, can result in damage to the safety belt.

A deflection element for safety belt systems in vehicles is known from German Patent No. DE 91 10 443, which has an attachment opening and a belt eye with a belt running surface for guiding a safety belt. The belt running surface has grooves that reduce the risk of lateral slipping if stress is placed on the belt. The structure and the production of the deflection element are not described.

SUMMARY OF THE INVENTION

It is therefore an object of the invention to provide a method for producing a deflection element, in which a metal body of the deflection element is formed by punching and cold deformation, and a safety belt is reliably guided in the deflection element.

The invention comprises a method for producing a deflection element for safety belt systems in vehicles. According to the invention, grooves are first made in a flat metal blank, using an embossing tool. A metal body is then produced from the metal blank, by punching and cold deformation, which body has an attachment opening and a belt eye having a belt running surface that is rounded in cross-section, to guide a safety belt. The belt running surface contains the grooves previously formed in the flat metal blank. The grooves only have to be made in the segment of the metal blank from which the belt running surface is formed by cold deformation. In this connection, grooves are understood to be narrow depressions in the belt running surface, into which the belt presses slightly in the case of stress that occurs in a crash situation. At least some of the grooves extend in the pulling direction of the safety belt. It is practical if a pattern of parallel or intersecting grooves is formed in the flat metal blank.

According to a preferred embodiment of the invention, the grooves in the belt running surface form a diamond pattern of intersecting grooves. This arrangement makes it possible for the deflection element to be optionally used on the front-seat passenger side or driver side of a vehicle. By means of the diamond pattern of intersecting grooves, it is guaranteed that when the deflection element is used optionally on the driver side or front-seat passenger side of a vehicle, a number of grooves always extend in the pulling direction of the belt and exert a stabilizing effect on the safety belt in a crash situation. The grooves that run cross-wise to that do not impair this function.

According to a preferred embodiment of the invention, the grooves are disposed at an angle of approximately 45° in a top view of the belt running surface. With this arrangement, particularly good guidance of the safety belt is guaranteed, which is pulled over the belt running surface at a corresponding angle, with reference to the vertical, during use in a normal case.

According to a preferred embodiment of the invention, the grooves, which are spaced apart, are disposed parallel to one another. However, it is also possible that the distance between the grooves changes in the pulling direction of the safety belt, particularly that it increases in the pulling direction of the safety belt.

It is practical if the grooves have a width between 1 mm and 5 mm, as well as a depth of 0.5 to 3 mm. However, dimensions deviating from this numerical information are also possible.

Subsequently, a slide coating that reduces the friction resistance on the belt running surface can be applied to the metal body. This can consist, for example, of a chrome layer applied galvanically. Slide coatings having a fluoropolymer matrix and reinforcement substances embedded therein, which has a layer thickness of less than 100 μm, are particularly suitable.

The deflection element can be combined with plastics, as described in German Patent No. DE 101 53 062 C1. It is practical if the deflection element is used together with a plastic adapter, which has a collar that can be inserted into the attachment opening of the metal body, as well as a displacement body that can be fixed in place at the upper edge of the belt eye, to limit the gap width of the belt eye. Depending on the installation situation, plastic side parts can furthermore be mounted on the outer edge of the metal body, which has been given the shape of a double-walled collar by the cold deformation.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 3 shows a top view of the belt running surface of the deflection element shown in FIGS. 1 and 2; and FIG. 4 shows the deflection element shown in FIG. 1 to 3 in an installed situation.

DETAILED DESCRIPTION OF THE PREFERRED EMBODIMENT

Figure 1:
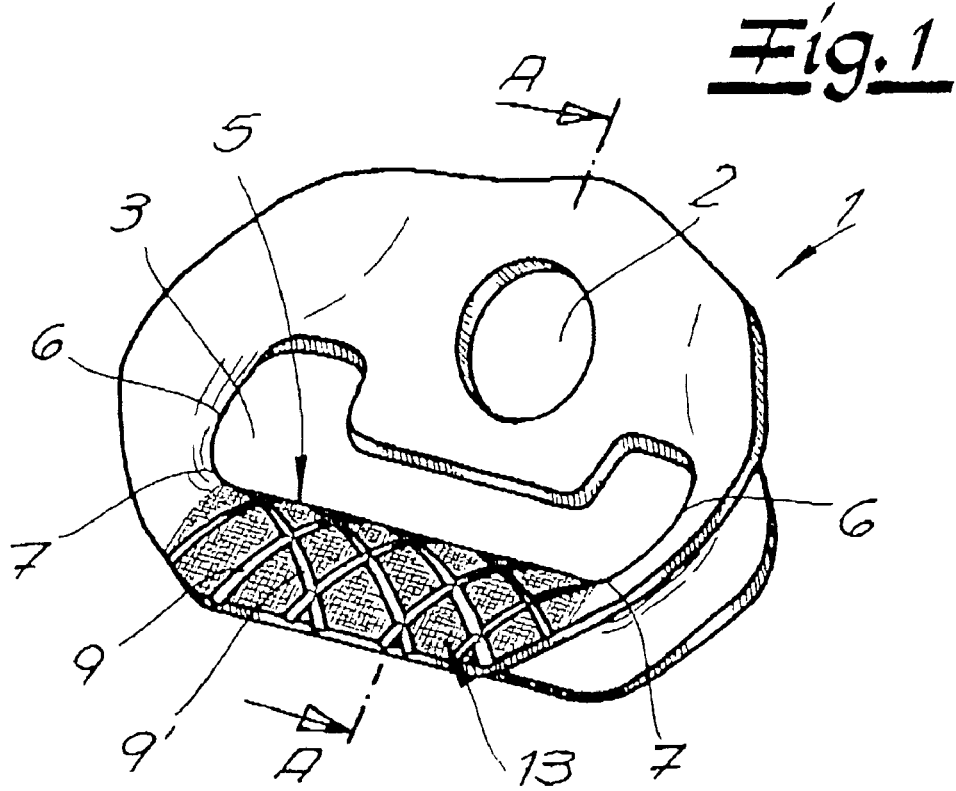
FIG. 1 shows a deflection element for a safety belt system in vehicles, in a perspective view.

Referring now in detail to the drawings, the deflection element shown in the figures consists of a metal body 1 produced from sheet steel by means of punching and cold deformation, having an attachment opening 2 and a belt eye 3 for guiding a safety belt 4. Belt eye 3 is delimited on the underside by a belt running surface 5 as well as laterally by belt guide segments 6, which constantly follow belt running surface 5 with a connection rounding 7, in each instance. Belt running surface 5, just like lateral belt guide segments 6, forms a slide surface. From a comparison of FIGS. 1 and 2, in particular, it is evident that the belt running surface 5 as well as lateral belt guide segments 6 have a cross-sectional profile 8 that is rounded in the pulling direction of safety belt 4.

Grooves 9, 9' are formed into metallic belt running surface 5. Grooves 9, 9' form a diamond pattern of intersecting lines, so that when the deflection element is optionally used on the driver or front-seat passenger side of a vehicle, a number of the grooves (9 or 9') always extend in the pulling direction of the belt. As shown in FIG. 3, grooves 9, 9' are disposed at an angle of approximately 45° in a top view of the belt running surface 5. The grooves, which are spaced apart, are disposed parallel to one another, and can have a width of 1 to 5 mm, for example, as well as a depth of 0.5 to 3 mm, for example.

To produce the deflection element, grooves 9, 9' are first made in a flat metal blank, using an embossing tool, and metal body 1 that was described is produced from the blank by means of punching and cold deformation. Subsequently, a slide coating that reduces the friction resistance on belt running surface 5 can be applied to metal body 1.

From the installation situation shown in FIG. 4, it is evident that the metallic deflection element can be combined with plastics. In the exemplary embodiment, a plastic adapter 10, which has a collar 11 that can be inserted into attachment opening 2 of metal body 1, is attached to the metal body, as well as a displacement body 12 that can be fixed in place at the upper edge of the belt eye, to limit the gap width of belt eye 3.

Figure 2:
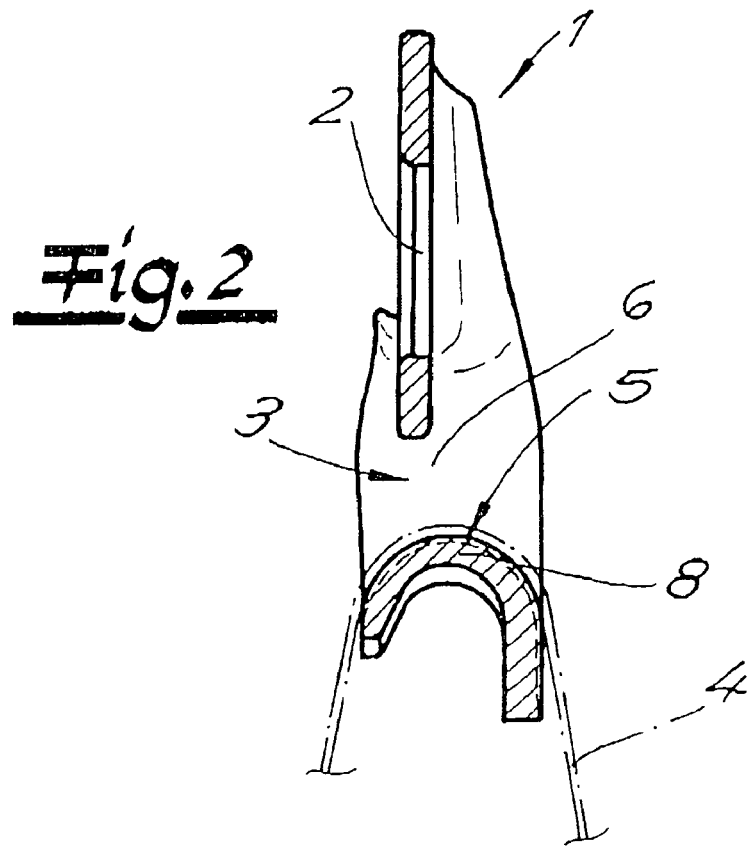
FIG. 2 shows the section A-A from FIG. 1.

Subsequently, a slide coating 13, as shown in FIGS. 1 and 4, that reduces the friction resistance on the belt running surface can be applied to the metal body. This can consist, for example, of a chrome layer applied galvanically. Slide coatings having a fluoropolymer matrix and reinforcement substances embedded therein, which has a layer thickness of less than 100 µm, are particularly suitable.

Accordingly, while only a few embodiments of the present invention have been shown and described, it is obvious that many changes and modifications may be made thereunto without departing from the spirit and scope of the invention.

What is claimed is:

1. A method for producing a deflection element for safety belt systems in vehicles, comprising:
    making grooves in a flat metal blank, using an embossing tool; and
    producing a metal body from the flat metal blank, by means of punching and cold deformation, said body having an attachment opening and a belt eye having a belt running surface that is rounded in cross-section to guide a safety belt,
    wherein the belt running surface contains the grooves previously formed in the flat metal blank.

2. A method according to claim 1, wherein the grooves form a pattern of parallel or intersecting grooves in the flat metal blank.

3. A method according to claim 2, wherein a diamond pattern of intersecting grooves is formed into the flat metal blank.

4. A method according to claim 1, wherein the metal body is formed so that the grooves are disposed at an angle of approximately 45° to a pulling direction of the belt running surface when viewed from a top of the belt running surface.

5. A method according to claim 1, wherein the grooves have a width between 1 and 5 mm and a depth of 0.5 to 3 mm.

6. A method according to claim 1, further comprising applying to the metal body a slide coating that reduces the friction resistance on the belt running surface.

* * * * *